(12) United States Patent
Yeh et al.

(10) Patent No.: US 11,861,679 B2
(45) Date of Patent: *Jan. 2, 2024

(54) ELECTRONIC LIST USER INTERFACE

(71) Applicant: Google LLC, Mountain View, CA (US)

(72) Inventors: Shih-Hao Yeh, Santa Clara, CA (US); Navid Samadani-McQuirk, San Bruno, CA (US); Jack Cameron Dille, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/394,160

(22) Filed: Aug. 4, 2021

(65) Prior Publication Data

US 2021/0365483 A1 Nov. 25, 2021

Related U.S. Application Data

(63) Continuation of application No. 16/129,338, filed on Sep. 12, 2018, now Pat. No. 11,170,033.

(Continued)

(51) Int. Cl.
*G06F 16/33* (2019.01)
*G06F 16/9038* (2019.01)
(Continued)

(52) U.S. Cl.
CPC ..... *G06Q 30/0633* (2013.01); *G06F 16/3334* (2019.01); *G06F 16/9038* (2019.01);
(Continued)

(58) Field of Classification Search
CPC ............... G06F 16/3334; G06F 16/955; G06F 16/9038; G06Q 30/0625; G06Q 30/0633
(Continued)

(56) References Cited

U.S. PATENT DOCUMENTS

| 10,198,762 B1 | 2/2019 | Dangltchev et al. |
| 2003/0120626 A1 | 6/2003 | Piotrowski |

(Continued)

FOREIGN PATENT DOCUMENTS

| CN | 101236635 | 8/2008 |
| CN | 106934694 | 7/2017 |

(Continued)

OTHER PUBLICATIONS

Final Office Action for U.S. Appl. No. 16/129,338 dated Oct. 14, 2020 (25 pages).

(Continued)

*Primary Examiner* — Robert W Beausoliel, Jr.
*Assistant Examiner* — Lauren Zannah Ganger
(74) *Attorney, Agent, or Firm* — Dority & Manning, P.A.

(57) ABSTRACT

Processing inputs to electronic list systems. Receiving, from a user device, a user input. Parsing the received user input for at least one of {product genus, product subgenus, product name, brand name, price information, retailer name, manufacturer name}. Querying a history of user activity using the parsed input. Receiving at least one product description responsive to the query. Presenting, via the user device, each received at least one product description to the user.

20 Claims, 8 Drawing Sheets

Related U.S. Application Data

(60) Provisional application No. 62/609,997, filed on Dec. 22, 2017.

(51) Int. Cl.
  *G06F 16/9535* (2019.01)
  *G06Q 30/0601* (2023.01)
  *G06F 16/955* (2019.01)

(52) U.S. Cl.
  CPC ....... *G06F 16/955* (2019.01); *G06Q 30/0625* (2013.01); *G06F 16/9535* (2019.01)

(58) Field of Classification Search
  USPC .......................................................... 707/722
  See application file for complete search history.

(56) References Cited

U.S. PATENT DOCUMENTS

| | | | |
|---|---|---|---|
| 2004/0148226 A1 | 7/2004 | Shanahan | |
| 2008/0071638 A1 | 3/2008 | Wanker | |
| 2010/0125574 A1* | 5/2010 | Navas | G06Q 10/10 707/E17.014 |
| 2010/0306080 A1* | 12/2010 | Trandal | G06Q 10/10 705/26.8 |
| 2012/0010876 A1 | 1/2012 | Smolenski et al. | |
| 2014/0067564 A1 | 3/2014 | Yuan | |
| 2015/0095188 A1 | 4/2015 | Lee et al. | |
| 2015/0221015 A1 | 8/2015 | Laha | |
| 2015/0242932 A1 | 8/2015 | Beguin et al. | |
| 2016/0048856 A1 | 2/2016 | Wouhaybi et al. | |
| 2016/0104254 A1 | 4/2016 | Zurada | |
| 2016/0125498 A1* | 5/2016 | Setty | G06Q 30/0627 705/26.63 |
| 2016/0275588 A1 | 9/2016 | Ye et al. | |
| 2018/0005305 A1 | 1/2018 | Hirsch | |
| 2018/0054408 A1 | 2/2018 | Morris | |
| 2018/0307761 A1* | 10/2018 | Felt | G06F 16/685 |
| 2019/0043473 A1 | 2/2019 | Levy | |
| 2019/0197182 A1 | 6/2019 | Yeh et al. | |
| 2020/0272664 A1 | 8/2020 | Aggour et al. | |

FOREIGN PATENT DOCUMENTS

| | | |
|---|---|---|
| CN | 107424032 | 12/2017 |
| JP | 2002-007834 | 1/2002 |
| JP | 2004-104532 | 4/2004 |
| JP | 2013-257793 | 12/2013 |
| KR | 20160038902 | 4/2016 |
| WO | WO-2017/211200 A1 | 12/2017 |

OTHER PUBLICATIONS

International Preliminary Report on Patentability, Ch. I, for PCI Appln. Ser. No. PCT/US2018/050702 dated Jul. 2, 2020 (8 pages).
International Search Report for PCT Appln. Ser. No. PCT/US2018/050702 dated Dec. 19, 2018 (4 pages).
Non-Final Office Action for U.S. Appl. No. 16/129,338 dated Apr. 3, 2020 (23 pages).
Non-Final Office Action for U.S. Appl. No. 16/129,338 dated Feb. 22, 2021 (26 pages).
Notice of Allowance for U.S. Appl. No. 16/129,338 dated Jun. 17, 2021 (5 pages).
Reasons for Rejection for JP Appln. Ser. No. 2020-518716 dated Jun. 14, 2021 (10 pages).
Written Opinion of the International Searching Authority for PCT Appln. Ser. No. PCT/US2018/050702 dated Dec. 19, 2018 (6 pages).
Machine Translated Chinese Search Report Corresponding to Application No. 201880064012.7 dated Mar. 21, 2023.

\* cited by examiner

300

Receive, from at least one queried user history, at least one product description responsive to the query
240

250

Present, via the user device, a plurality of matching items in a hierarchy organized by product name, with lower hierarchy levels comprising one or more of price information, retailer name, manufacturer name, size, and quantity
352

ELECTRONIC LIST USER INTERFACE

CROSS-REFERENCE TO RELATED APPLICATION

This application claims the benefit of priority under 35 U.S.C. § 120 as a continuation of U.S. patent application Ser. No. 16/129,338, filed Sep. 12, 2018, which claims the benefit of priority under 35 U.S.C. § 119 to U.S. Provisional Patent Application No. 62/609,997, filed Dec. 22, 2017, each of which is incorporated by reference herein in its entirety.

TECHNICAL FIELD

The technology disclosed herein is related to technologies to process inputs to electronic list systems. Particular examples relate to the use of user history to process list inputs.

SUMMARY

The technology described herein includes computer implemented methods, computer program products, and systems to process inputs to electronic list systems. In some examples, the electronic list system receives, from a user device, a user input. The electronic list system parses the received user input for at least one of {product genus, product subgenus, product name, brand name, price information, retailer name, and manufacturer name}. The electronic list system queries a history of user activity using the parsed input. The electronic list system receives at least one product description responsive to the query; and presents, via the user device, each received at least one product description to the user.

In some examples, the history of user activity is one or more of a history of user purchases initiated through the electronic list system, a history of user purchases initiated through the shopping services other than the list system, and a history of user world wide web activity, e-mail activity, and scanned receipts.

In some examples, in response to receiving user selection of a presented item, the electronic list orders the item for the user from a shopping service associated with the selected item. In some examples presenting includes presenting, via the user device, a plurality of matching items in a hierarchy organized by product name, with lower hierarchy levels comprising one or more of price information, retailer name, manufacturer name, size, and quantity.

In some examples, presenting includes presenting, via the user device, each previously purchased item with an indication that the item was previously purchased.

These and other aspects, objects, features, and advantages of the technology described herein will become apparent to those having ordinary skill in the art upon consideration of the following detailed description of illustrated examples.

BRIEF DESCRIPTION OF THE DRAWINGS

FIG. 3 is a block diagram illustrating methods to process inputs to electronic list systems, in accordance with certain examples.

DETAILED DESCRIPTION OF THE EXAMPLES

Smart electronic lists can leverage shopping data to help users shop a list. However, inputs to lists, such as voice and text inputs, suffer from several problems. For example, inputs can be one or more of: sporadic, generalized, and often poorly focused. As another example, inputs can mix product description, product price, product source, and product brand information—in no certain order.

The combination of sporadic, generalized, mixed, and often poorly-focused inputs to such lists (including from multiple users of a single list), the requirement for highly-specific product descriptions required as inputs by shopping services, and the unavailability of non-electronic methods to reconcile the differences between such inputs, creates unaddressed problems unique to electronic commerce.

By using and relying on the methods and systems described herein, the technology disclosed herein can maintain, and in some examples shop, an accessible list that is organized and includes recommendations and other helpful features. As such, the technology may be employed to address problems unique to electronic lists in electronic commerce, such as the conflict described above.

Turning now to the drawings, in which like numerals represent like (but not necessarily identical) elements throughout the figures, examples of the present technology are described in detail.

Example System Architectures

Figure 1:
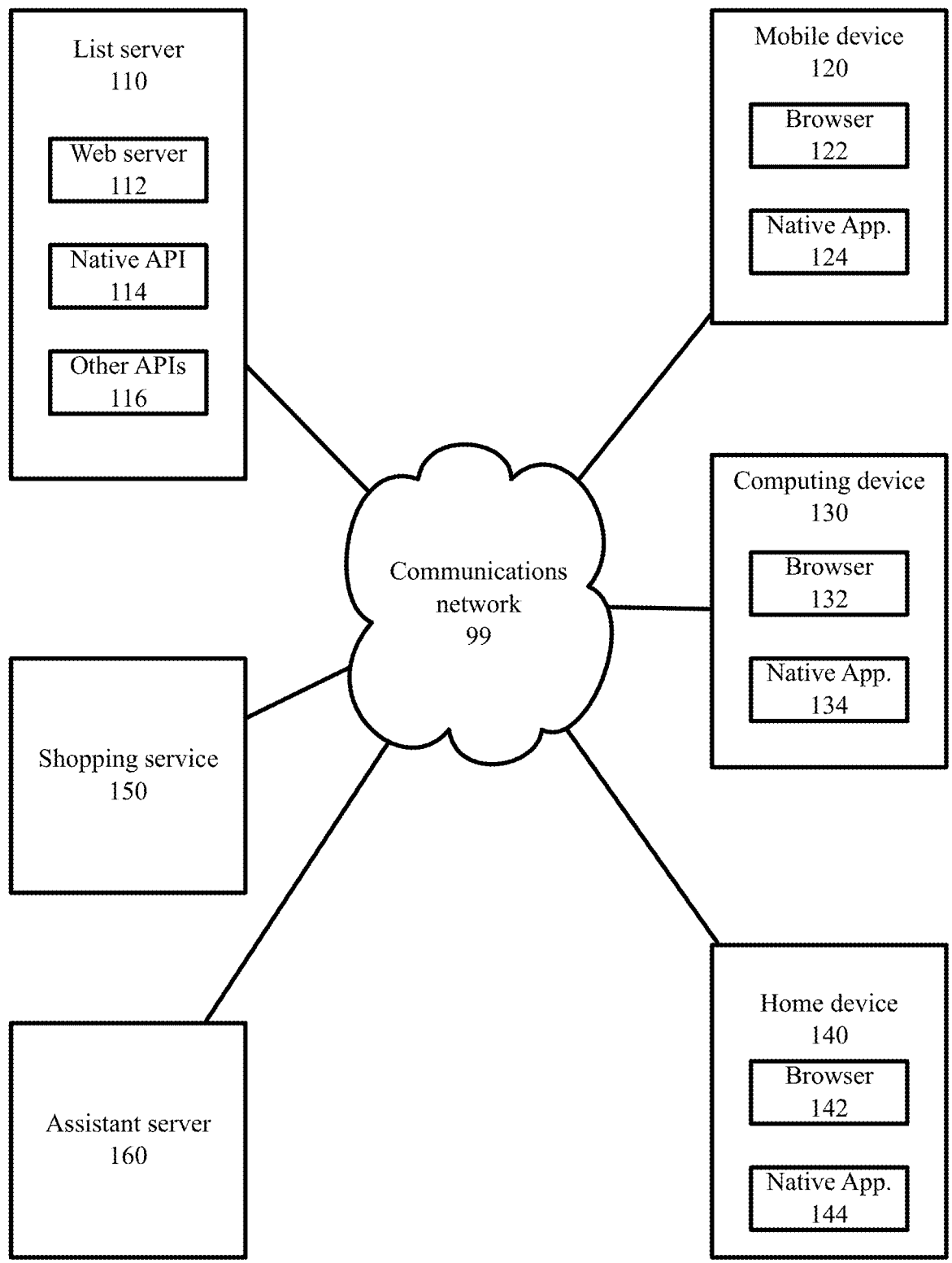
FIG. 1 is a block diagram depicting an operating environment to provide a user interface for an electronic list, in accordance with certain examples.

FIG. 1 is a block diagram depicting an example operating environment 100 in accordance with certain examples of the technology disclosed herein. While each server, system, and device shown in the operating environment is represented by one instance of the server, system, or device, multiple instances of each can be used. Further, while certain aspects of operation of the present technology are presented in examples related to FIG. 1 to facilitate enablement of the claimed invention, additional features of the present technology, also facilitating enablement of the claimed invention, are disclosed elsewhere herein.

As depicted in FIG. 1, the example operating environment 100 includes computing devices 110, 120, 130, 140, 150, and 160. Each of devices 110, 120, 130, 140, 150, and 160 may be configured to communicate with one another via communications network 99. In some examples, a user associated with a device must install an application and/or make a feature selection to obtain the benefits of the technology described herein.

Network 99 includes one or more wired or wireless telecommunications means by which network devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system, that facilitates the RF communication of signals, data, and/or messages. Throughout the discussion of examples, it should be understood that the terms "data" and "information" are used interchangeably herein to refer to text, images, audio, video, or any other form of information that can exist in a computer-based environment.

Each computing device 110, 120, 130, 140, 150, and 160 can include a communication module capable of transmitting and receiving data over the network 99. For example, each network device can include a server, a desktop computer, a laptop computer, a tablet computer, a television with one or more processors embedded therein and/or coupled thereto, a smart phone, a handheld computer, a personal digital assistant (PDA), or any other wired or wireless processor-driven device.

In examples described herein, computing device 110 is a list server 110 operative to practice examples of the technology disclosed herein. In some examples, the list server 110 provides Create, Read, Update, and Delete (CRUD) functionality for lists, and products in a list, in conjunction with one or more mobile devices 120, computing devices 130 such as laptop computers, desktop computers, tablet computers, smart watches, and wearables, and home devices 140 such as Google Home appliance.

The Create function can provide application programming interfaces (APIs) from the list server 110 and graphic user interfaces (GUIs) in conjunction with web browsers (122, 132, 142) or native applications (124, 134, 144) on various devices (120, 130, 140) to the user to search across the catalog(s) visible to the list server 110 (such as internal catalogs and catalogs of shopping service 150), create lists, and shop the created lists (including shopping via shopping service 150).

The Read function can provide APIs and GUIs in a similar fashion to search for and display created lists and listed products. The Update and Delete functions provide user interfaces for editing and saving created lists and listed products. Other functionality of the technology provides APIs and GUIs for setting list administrative characteristics, and provides user interfaces for communicating and collaborating with other users.

Each of mobile device 120 and computing device 130 can receive text, touch, image, and voice inputs for CRUD, administrative, and communication functions through the corresponding browser or native application. Home device 140 primarily receives voice inputs and responds with audio outputs, though some examples of home device can interact with users via a GUI. In some examples, such inputs can be processed in conjunction with an assistant server 160 implementing a virtual personal assistant, such as Google Assistant, as part of the interface to the list server 110.

The connections illustrated are examples, and other means of establishing a communications link between the computers and devices can be used. Moreover, those having ordinary skill in the art having the benefit of the present disclosure will appreciate that the computing devices illustrated in FIG. 1 may have any of several other suitable computer system configurations. For example, computing device 130 may be embodied as wearable device and may not include all the components described above.

Figure 8:
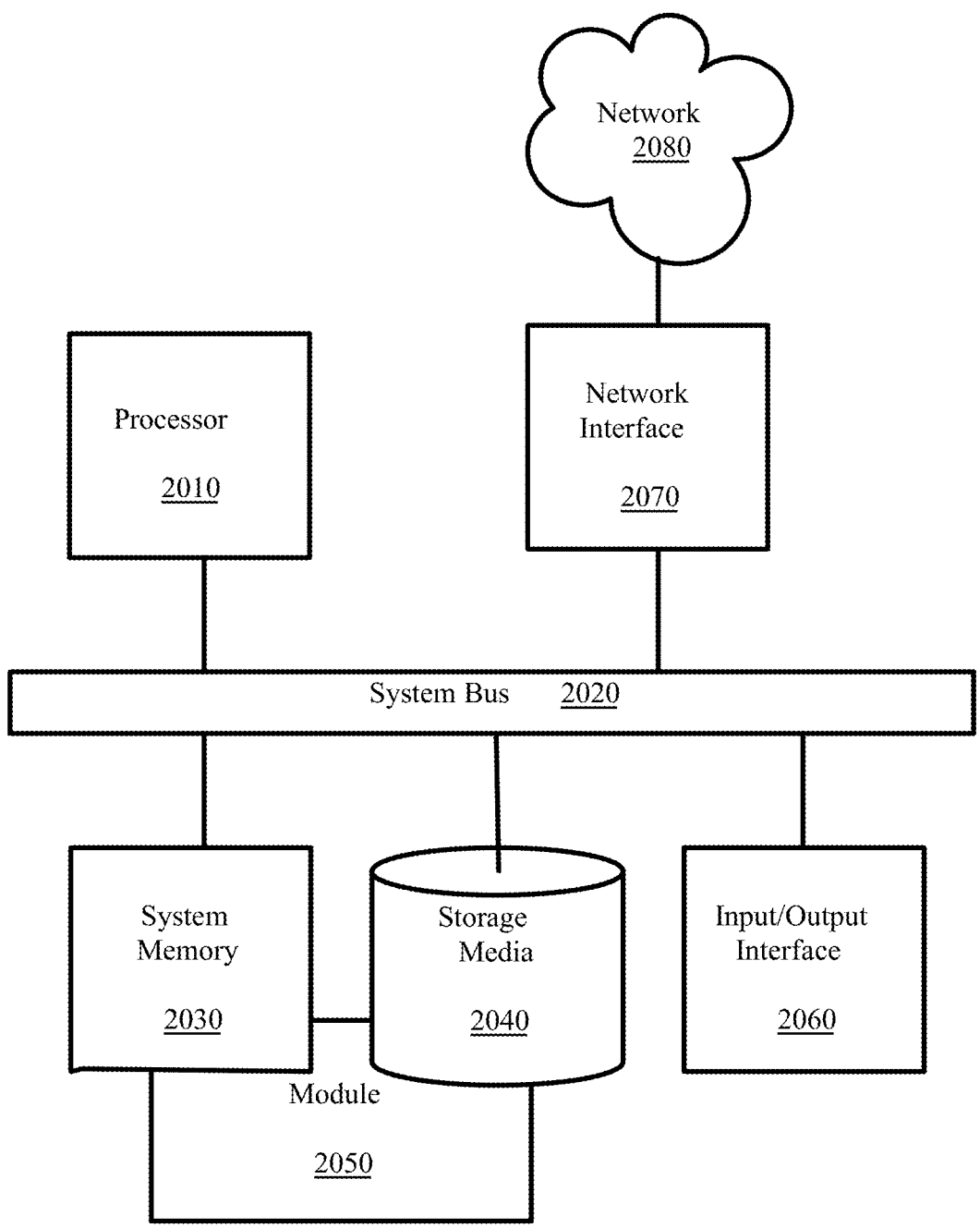
FIG. 8 is a block diagram depicting a computing machine and a module, in accordance with certain examples.

In examples, the computing devices, and any other computing machines associated with the technology presented herein, may be any type of computing machine such as, but not limited to, those discussed in more detail with respect to FIG. 8. Furthermore, any modules associated with any of these computing machines, such as modules described herein or any other modules (scripts, web content, software, firmware, or hardware) associated with the technology presented herein may be any of the modules discussed in more detail with respect to FIG. 8. The computing machines discussed herein may communicate with one another as well as other computer machines or communication systems over one or more networks, such as network 99. The network 99 may include any type of data or communications network, including any of the network technology discussed with respect to FIG. 8.

Example Processes

The example methods illustrated in the figures are described hereinafter with respect to the components of the example operating environment 100. The example methods also can be performed with other systems and in other environments. The operations described with respect to any of the figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
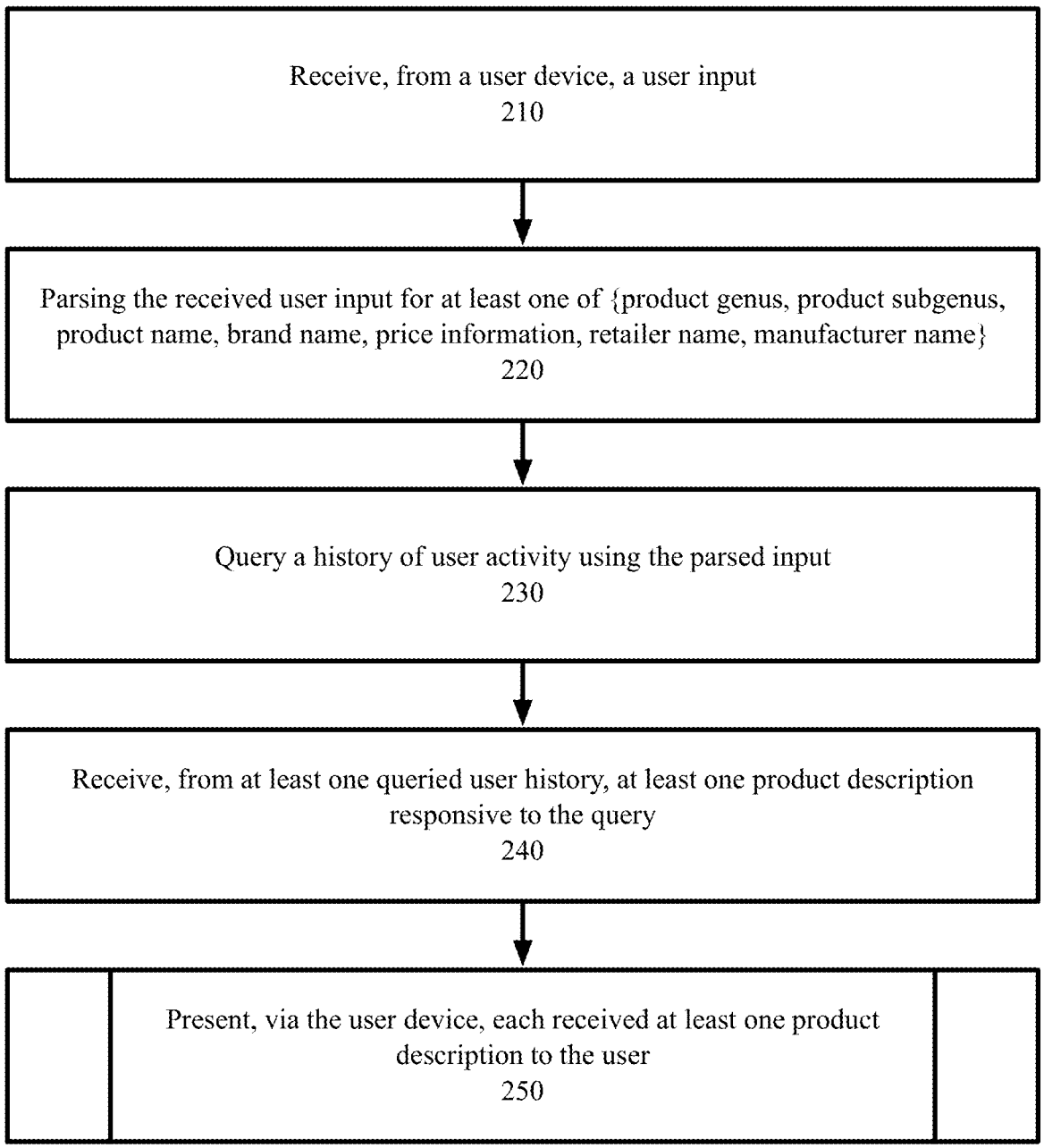
FIG. 2 is a block diagram illustrating methods to process inputs to electronic list systems, in accordance with certain examples.

Referring to FIG. 2, and continuing to refer to FIG. 1 for context, methods 200 to process inputs to electronic list systems are illustrated in accordance with certain examples. In such methods 200, the list server 110 receives a user input via a user device such as mobile device 120—Block 210. As a continuing example, consider a user providing the voice input "toys for Tommy from Wee Bee Toys" to a home device 140 running a native application 144 to listen for voice commands. The native application 144 transmits the received voice data to the assistant server 160 over network 99 for the assistant server 160 to perform speech-to-text-data conversion. The assistant server 160 transmits a text file corresponding to voice input to the list server 110 via an API (the receiving side of which, API 116, is shown in FIG. 1). In other examples, speech-to-text-data conversion occurs in either the user device, such as home device 140, mobile device 120, and computing device 130. In another example, the speech-to-text-data conversion occurs in list server 110 itself.

The list server 110 parses the received user input for at least one of {product genus, product subgenus, product name, brand name, price information, retailer name, manufacturer name}—Block 220. In the continuing example, list server 110 uses keyword lists to identify data types of single-word and multi-word elements of the text file. Specifically, "toys," is a product genus—but also appears as part of the string "wee_bee_toys," a retailer name. In this case, the second use of "toys" is recognized as part of the string "wee_bee_toys." In addition, in this case, the list server 110 recognizes "Tommy" as a name. Note that "doll" is a product subgenus under "toys," while a stock-keeping unit (SKU)

descriptor of a specifically configured doll from a specific manufacturer (and possible a specific retailer) is the most granular level. Techniques such as Natural Language Processing (NLP), machine learning and other artificial intelligence approaches, and semi-automated classification, can be used in addition to, or in place of, keyword list comparisons.

Upon parsing a minimum set of product data for querying a shopping service, the list server 110 queries a history of user activity using the parsed input—Block 230. In the continuing example, the list server 110 queried the product genus "toys," retailer "Wee Bee Toys," and name "Tommy" are queried to a structured database of user purchase history maintained by the data list server 110 to identify a plurality of products characterized by fields matching the parsed data. In the continuing example, shopping service 150 accepts a structured/tagged query {<genus="toys"> AND <retailer="Wee Bee Toys"> AND <name="Tommy">}. In some examples, wildcards and unstructured queries are used.

The list server 110 receives from at least one queried user history, at least one product description responsive to the query—Block 240. In the continuing example, history maintained for the user by shopping server 110 returns 40 product descriptions across three sub-genera—"trucks," "cars," and "puzzles," from which the user has previously purchased toys from Wee Bee Toys for Tommy.

While the continuing example illustrates the present technology using a user history maintained by the list server, the technology can use user histories maintained by other servers (for example, shopping service 150), and can use other sources of context such as user preferences, data from a user's email account, scanned receipts, popular items, sales items, purchase habit of others such as friends and social media personalities.

The list server 110 presents, via the user device, each received at least one product description to the user—Block 250. Referring to FIG. 3, and continuing to refer to prior figures for context, methods 300 for presenting each received product description are shown, in accordance with certain examples. In such examples, the list server 110 presents, via the user device 120, a plurality of matching items in a hierarchy organized by product name, with lower hierarchy levels comprising one or more of price information, retailer name, manufacturer name, size, and quantity—Block 352.

Figure 4:
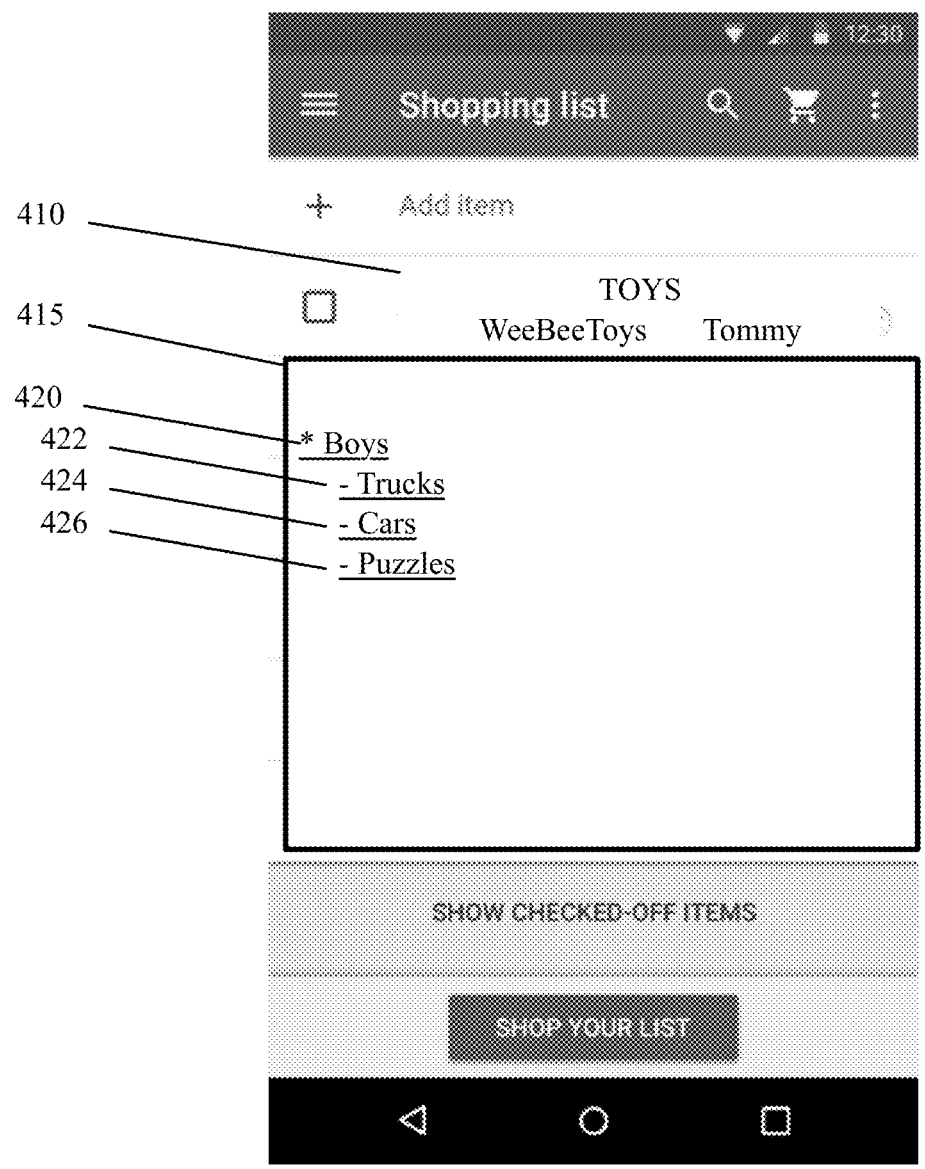
FIG. 4 is a diagram illustrating a user interface of the present technology, in accordance with certain examples.

Referring to FIG. 4, and continuing to refer to prior figures for context, a user interface screen 400 for presenting each received product description to the user via the user device is shown, in accordance with certain examples. In the continuing example, a user interface screen 400 for user device 120 presented via native application 144 includes the initial input "toys" from "WeeBee Toys" for the "Tommy" as list item 410 along with a hierarchical representation 415 of the results returned by shopping service 150. The list item entry includes the retailer "WeeBee Toys" and intended recipient "Tommy" parsed from the user input. The hierarchical representation 415 includes one second-level entry "Boys" 420, which is hyperlinked to separate native application 144 user interface screens presenting those results under each respective heading. User interface screen 400 shows the "Boys" 420 sub-list to include lower levels of the hierarchy for "trucks" 422, "cars" 424, and "puzzles" 426.

Figure 5:
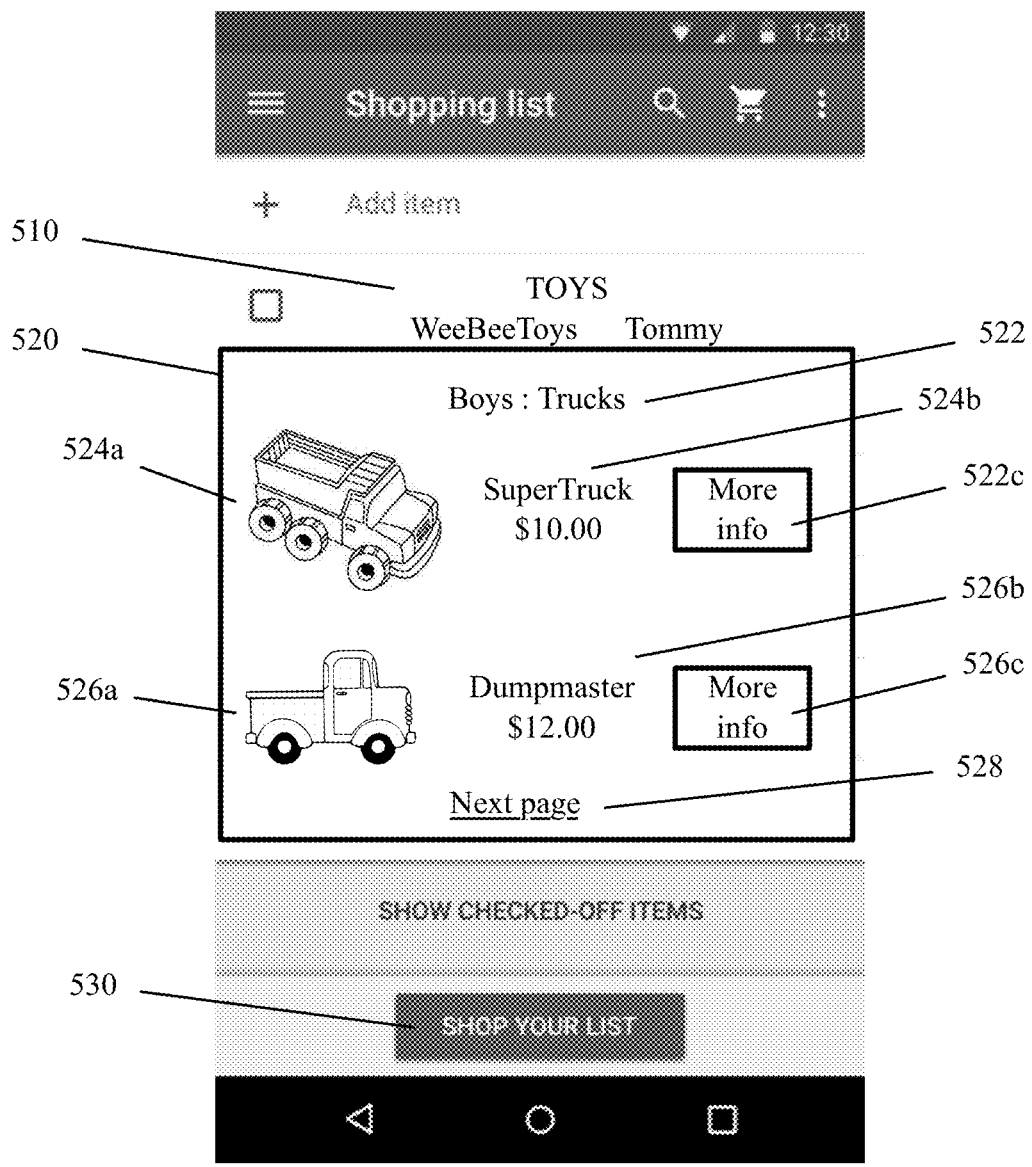
FIG. 5 is a diagram illustrating a user interface of the present technology, in accordance with certain examples.

Referring to FIG. 5, and continuing to refer to prior figures for context, a user interface screen 500 for presenting each received product description to the user via the user device is shown, in accordance with certain examples. In the continuing example, a user interface screen 500 for user device 120 presented via native application 144 is presented in response to the user selecting the "Trucks" hyperlink 422. The user interface screen 500 includes product list window 520. Product list window 520 displays product entries for two products (SuperTruck 524 and Dumpmaster 526) of entries returned in the category "Boys:Trucks" 522 from shopping service 150 in response to the query built from the user input for "toys from Wee Bee Toys for Tommy." The SuperTruck entry 524 includes an illustration 524a, name and price 524b, and a "More info" button 522c. The Dumpmaster entry 526 includes similar components for illustration 526a, name and price 526b, and "More info" button 526c. The product list window also includes a hyperlinked "Next Page" link for viewing the remaining product entries in in the category returned from shopping service 150 in response to the query. Selecting the "More info" button will cause the list server 110 to display a product page for the corresponding product via the user device 120. While the user can use the list for tracking in-person shopping at brick-and-mortar retail locations, the user interface screen 500 also includes a "SHOP YOUR LIST" button 530 that will, in some examples, link to a product page of the user interface. While FIG. 5 shows one checkbox entry of the list, the list can, and in most instances will, include multiple items. Depending on the display capabilities of the user device, more than one item per page can be displayed. With each type of user device, the technology can display multiple items across multiple pages.

Figure 6:
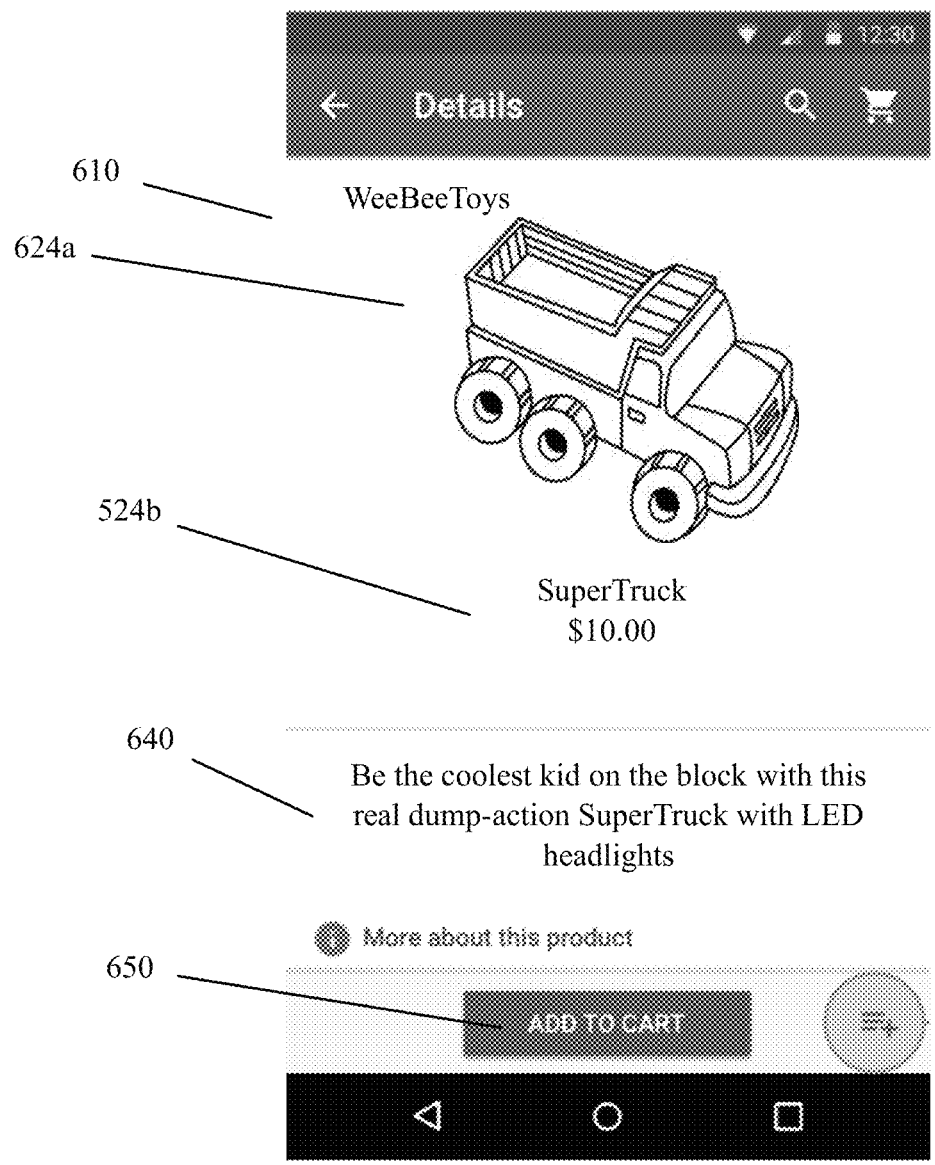
FIG. 6 is a diagram illustrating a user interface of the present technology, in accordance with certain examples.

Referring to FIG. 6, and continuing to refer to prior figures for context, a user interface screen 600 for presenting each received product description to the user via the user device is shown, in accordance with certain examples. In the continuing example, a user interface screen 600 for user device 120 presented via native application 144 includes product page 610. Product page 710 includes image 524a and product title 524b similar to those shown in connection with FIG. 5, along with product description 640. In particular, interface screen 600 includes "ADD TO CART" button 650 that adds the item to the user's cart for checkout. If the user is using the list to shop in person, then the list view of FIG. 4 and FIG. 5.

Figure 7:
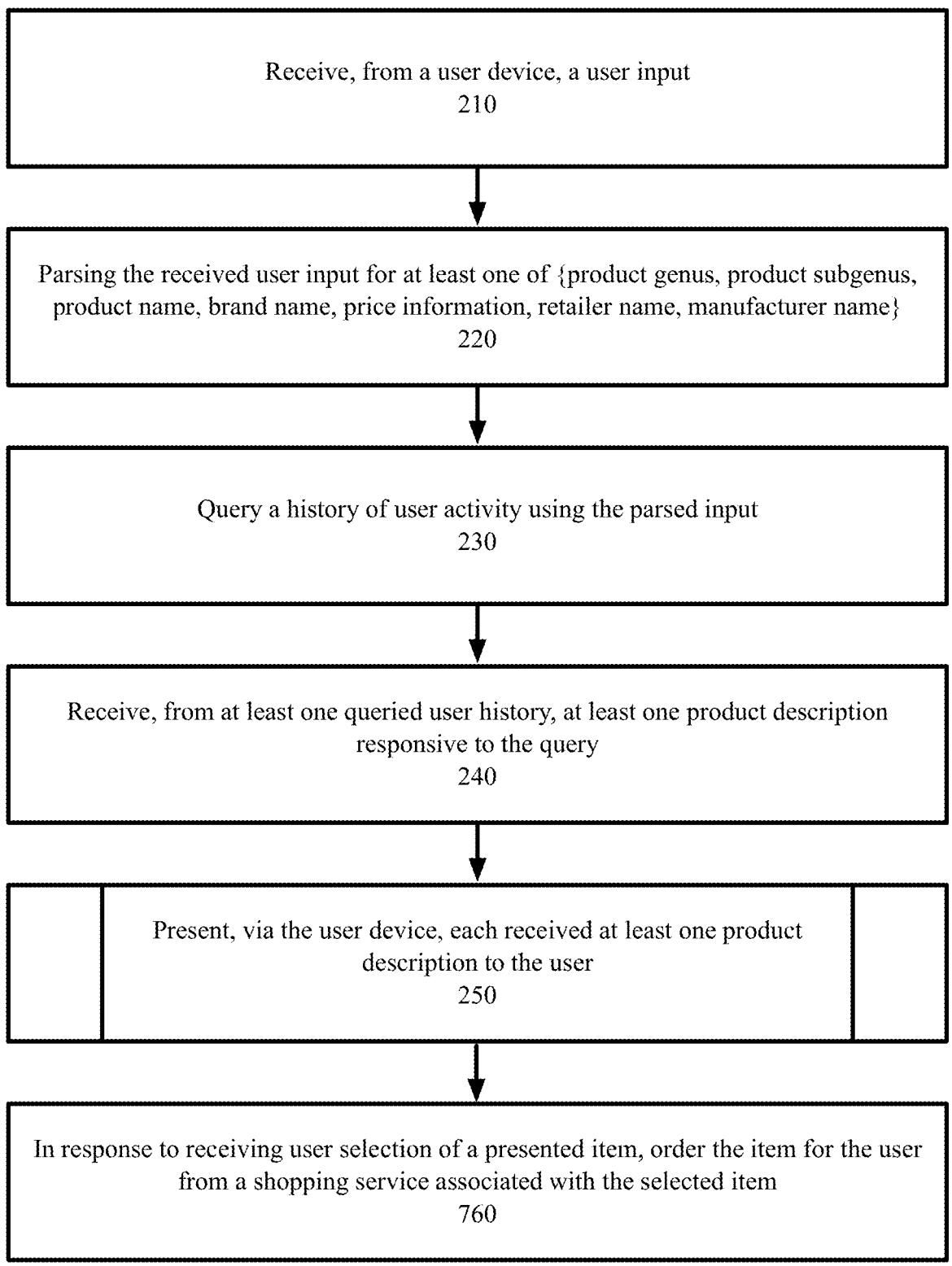
FIG. 7 is a block diagram illustrating methods to process inputs to electronic list systems, in accordance with certain examples.

Referring to FIG. 7, and continuing to refer to prior figures for context, methods 700 to process inputs to electronic list systems are illustrated in accordance with certain examples. In such methods, the list server 110, in response to receiving user selection of a presented item, orders the item for the user from a shopping service associated with the selected item. In the continuing example, selection of the "ADD TO CART" 750 button initiated the order process. In some examples, presenting includes presenting, via the user device, each previously purchased item with an indication that the item was previously purchased. In some examples, presenting includes presenting, via the user device, each previously purchased item with an indication of one or more of when it was purchased, from which retailer it was purchased, and notes on the recipient's review of the item.

Other Examples

FIG. 8 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

The present technology may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the present technology in computer programming, and the examples should not be construed as limited to any one set of computer program instructions. Further, a skilled programmer would be able to write such a computer program to implement the present technology as described herein based on the appended flow charts and associated description in the application text. Therefore, disclosure of a particular set of program code instructions is not considered necessary for an adequate understanding of how to make and use the technology described herein. Further, those skilled in the art will appreciate that one or more aspects of the technology described herein may be performed by hardware, software, or a combination thereof, as may be embodied in one or more computing systems. Moreover, any reference to an act being performed by a computer should not be construed as being performed by a single computer as more than one computer may perform the act.

The technology described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation to encompass such alternate examples.

Although specific examples have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of technology described herein defined in the following claims, the scope of which is to be accorded the broadest interpretation so as to encompass such modifications and equivalent structures.

What is claimed is:

1. A system, comprising:
  a first system comprising one or more processors coupled to memory to:
    receive, from a client device, a voice input detected by a microphone of the client device;
    process the voice input to identify one or more types of data in the voice input to use to form a set of product data;
    identify at least one shopping service of one or more shopping services that is configured to accept a query comprising the one or more types of data identified from processing the voice input;
    generate one or more queries from the set of product data formed based on the one or more types of data identified from processing the voice input;
    query, using the one or more queries generated by the first system from the set of product data, each of: i) a database of the first system, ii) the at least one shopping service different from the first system, and iii) an electronic messaging account associated with the client device for historical activity;
    receive at least one product description responsive to the one or more queries to the first system, the at least one shopping service different from the first system; and
    transmit, to the client device via a network, the at least one product description to cause the client device to present the at least one product description via an output interface of the client device.

2. The system of claim 1, wherein the historical activity is associated with the client device corresponding to the set of product data identified from the voice input.

3. The system of claim 1, wherein the historical activity comprises a history of purchases associated with the client device and initiated through the first system.

4. The system of claim 1, wherein the historical activity is associated with the client device and comprises a history of purchases initiated through one or more shopping services other than the first system.

5. The system of claim 1, wherein the historical activity comprises one or more of world wide web activity, e-mail activity, or scanned receipts.

6. The system of claim 1, wherein the one or more types of data comprise at least one of {product genus, product subgenus, product name, brand name, price information, retailer name, manufacturer name}.

7. The system of claim 1, further comprising:
the first system to order, responsive to a selection of an item corresponding to the at least one product description presented via the output interface of the client device, the item from a shopping service associated with the item.

8. The system of claim 1, comprising:
the first system to transmit, to the client device, a plurality of matching items in a hierarchy organized by product name, with lower hierarchy levels comprising one or more of price information, retailer name, manufacturer name, size, and quantity.

9. The system of claim 1, comprising:
the first system to transmit, to the client device for presentation via the output interface of the client device, one or more previously purchased items with an indication that the one or more previously purchased items was previously purchased.

10. A method, comprising:
receiving, by an electronic list system comprising one or more processors coupled to memory, from a client device, a voice input detected by a microphone of the client device;
processing, by the electronic list system, the voice input to identify one or more types of data in the voice input to use to form a set of product data;
identifying, by the electronic list system, at least one shopping service of one or more shopping services that is configured to accept a query comprising the one or more types of data identified from processing the voice input;
generating, by the electronic list system, one or more queries from the set of product data formed based on the one or more types of data identified from processing the voice input;
querying, by the electronic list system, using the one or more queries generated by the electronic list system from the set of product data, each of: i) a database of the electronic list system, ii) the at least one shopping service different from the electronic list system, and iii) an electronic messaging account associated with the client device for historical activity;
receiving, by the electronic list system, at least one product description responsive to the one or more queries to the electronic list system, the at least one shopping service different from the electronic list system; and
transmitting, by the electronic list system, to the client device via a network, the at least one product description to cause the client device to present the at least one product description via an output interface of the client device.

11. The method of claim 10, wherein the historical activity is associated with the client device corresponding to the set of product data identified from the voice input.

12. The method of claim 10, wherein the historical activity comprises a history of purchases associated with the client device and initiated through the electronic list system.

13. The method of claim 10, wherein the historical activity is associated with the client device and comprises a history of purchases initiated through one or more shopping services other than the electronic list system.

14. The method of claim 10, wherein the historical activity comprises one or more of world wide web activity, e-mail activity, or scanned receipts.

15. The method of claim 10, wherein the one or more types of data comprise at least one of {product genus, product subgenus, product name, brand name, price information, retailer name, manufacturer name}.

16. The method of claim 10, further comprising:
ordering, by the electronic list system, responsive to a selection of an item corresponding to the at least one product description presented via the output interface of the client device, the item from a shopping service associated with the item.

17. The method of claim 10, comprising:
transmitting, by the electronic list system, to the client device, a plurality of matching items in a hierarchy organized by product name, with lower hierarchy levels comprising one or more of price information, retailer name, manufacturer name, size, and quantity.

18. The method of claim 10, comprising:
transmitting, by the electronic list system, to the client device for presentation via the output interface of the client device, one or more previously purchased items with an indication that the one or more previously purchased items was previously purchased.

19. A computer program product, comprising:
a non-transitory computer-readable storage device having computer-executable program instructions embodied thereon that when executed by a computer cause the computer to process inputs to an electronic list system, the computer-executable program instructions comprising instructions to:
receive, from a client device, a voice input detected by a microphone of the client device;
process the voice input to identify one or more types of data in the voice input to use to form a set of product data;
identify at least one shopping service of one or more shopping services that is configured to accept a query comprising the one or more types of data identified from processing the voice input;
generate one or more queries from the set of product data formed based on the one or more types of data identified from processing the voice input;
query using the one or more queries generated by the electronic list system from the set of product data, each of: i) a database of the electronic list system, ii) the at least one shopping service different from the electronic list system, and iii) an electronic messaging account associated with the client device for historical activity;
receive at least one product description responsive to the one or more queries to the electronic list system, the at least one shopping service different from the electronic list system; and
transmit, to the client device via a network, the at least one product description to cause the client device to present the at least one product description via an output interface of the client device.

20. The computer program product of claim 19, wherein historical activity is associated with the client device corresponding to the set of product data identified from the voice input.

* * * * *